United States Patent [19]

Greenwood et al.

[11] Patent Number: 5,201,844
[45] Date of Patent: Apr. 13, 1993

[54] ROTOR AND BEARING ASSEMBLY

[75] Inventors: Anthony P. Greenwood, Mason; Anthony G. O'Meara, Cincinnati, both of Ohio

[73] Assignee: General Electric Company, Cincinnati, Ohio

[21] Appl. No.: 756,653

[22] Filed: Sep. 9, 1991

[51] Int. Cl.⁵ .............................................. F01D 25/16
[52] U.S. Cl. ................................ 415/122.1; 415/124.1
[58] Field of Search ............... 415/122.1, 124.1, 170.1; 60/39.142, 39.33; 384/454, 494

[56] References Cited

U.S. PATENT DOCUMENTS

| 2,951,631 | 9/1960 | Gregory | 415/122.1 |
| 3,536,369 | 10/1970 | Ainsworth et al. | 384/494 |
| 4,062,186 | 12/1977 | Snow et al. | 60/39.142 |
| 4,201,426 | 6/1980 | Garten et al. | 415/170.1 |
| 4,306,755 | 12/1981 | Roberts | 384/494 |
| 4,463,994 | 8/1984 | Eliason et al. | 308/196 |
| 4,578,942 | 4/1986 | Weiler | 415/170.1 |
| 4,915,514 | 4/1990 | Söderlund | 384/454 |

FOREIGN PATENT DOCUMENTS 1051287 2/1959 Fed. Rep. of Germany ...... 384/494

OTHER PUBLICATIONS

CFM56-2 Manual.
CFM56-2 Basic Engine Manual p. 84.

Primary Examiner—Edward K. Look
Assistant Examiner—Michael S. Lee
Attorney, Agent, or Firm—Jerome C. Squillaro

[57] ABSTRACT

A gas turbine engine rotor assembly is provided for rotatably mounting a rotor mounted power takeoff gear of an inlet gear box and a forward end of a high pressure rotor within an engine frame. The gear and rotor are mounted to forward and aft portions respectively of a gear shaft which is at least partially supported by a radial roller bearing having an outer race supportably mounted to the fan frame of the engine frame and an inner race directly mounted to the gear shaft between the gear and rotor.

5 Claims, 1 Drawing Sheet

ROTOR AND BEARING ASSEMBLY

BACKGROUND OF THE INVENTION

Field of the Invention

This invention relates to gas turbine engine rotor and bearing assemblies and particularly to thrust bearing support of high pressure compressor rotors and power take off shaft gears.

Description of Related Art

Gas turbine engines conventionally transfer rotational mechanical energy to rotationally driven accessories through a series of gear boxes and shafts from an engine rotor. Dual rotor fan jet engines typically have nearly right angle internal gearbox driven by a high pressure rotor for taking power from the engine rotor essentially radially outward through a power takeoff shaft to an engine accessory gearbox.

The internal gearbox has two meshed bevel gears, one attached to the high pressure rotor and the other attached to the power takeoff shaft. Because of the structure required to support these shafts and to pass the power across the engine flowpath the internal gearbox is axially mounted within a fan frame comprised of annular engine casings tied together by radial struts. The fan frame also provides a good structure for mounting the rotors thrust and radial bearings. Shafts that may be easily coupled and uncoupled are useful to provide easy engine assembly and disassembly and enhance the modularity of gas turbine engines, a particularly desirable enhancement for large fan diameter engines.

Prior engine designs have shown high pressure compressor (HPC) shafts or rotors having an HPC stub shaft extending axially forward and splined within a gear shaft that supports a rotor mounted bevel gear. Gear shafts are employed to enhance the modularity of gas turbine engines. The splined shafts and gear assembly is axially held together by a thread and locknut arrangement. Thrust bearings are typically of the ball bearing type having inner and outer annular races supporting the balls of the bearing wherein the inner race is mounted on the outside of the gear shaft and the outer race is mounted to the engine frame. Radial bearings are typically of the roller type mounted wherein rollers are disposed between the races. The high rotational speeds of gas turbine engines, particularly those associated with high pressure or core engine rotors, pose various problems for engine designers.

Radial stackup resulting from two concentric shafts, the HPC stub shaft splined within the gear shaft, makes it more difficult to maintain a predetermined or design point internal radial clearance (IRC) for the radial bearings than for a single shaft arrangement. Control of the IRC is very important to the bearing life span. IRC's that are either negative (a condition indicating the pinching of roller elements between their respective races) or too large will result in a reduction in the bearings life span.

The multi-shaft and bearing arrangement for the gear and HPC stub shaft is enhanced by (or perhaps even requires) the use of different shaft materials and, for example, the HPC stub shaft is preferably made of a titanium alloy while the gear shaft is a steel alloy. Tight cold fits between these shafts are therefore required to allow for differential thermal growth between the shafts. Tight fits result in high assembly and disassembly loads which cause excessive locknut and HPC stub shaft thread wear. Tight fits also contribute to the problem of controlling bearing IRC.

The size and weight of bearings supporting a two concentric shaft arrangement is greater than for a single shaft arrangement. Therefore it would be advantageous to have a bearing provide direct radial support to a single shaft.

SUMMARY OF THE INVENTION

The present invention provide a power takeoff gear and engine rotor assembly that is easy to assemble and disassemble and reduces bearing IRC compared to conventional designs.

The preferred embodiment of the invention provides a power takeoff gear and engine rotor assembly having a horizontal power takeoff gear splined to the forward portion of a gear shaft and a high pressure compressor (HPC) stub shaft splined to the gear shaft at a distance axially aft of the horizontal power takeoff gear. At least one bearing directly supports the gear shaft between the horizontal gear and the HPC stub shaft wherein the bearings inner race is mounted to the gear shaft. In the preferred embodiment the gear shaft is supported by a thrust bearing aft of the horizontal gear and a radial roller bearing forward of the HPC stub shaft.

ADVANTAGES

Among the advantages provided by the present invention is increased control of bearing internal radial clearance (IRC) which increases the life of the bearing. Another advantage of the present invention is that for a predetermined shaft diameter it allows the use of smaller diameter bearing races than would otherwise be possible with the use of prior designs of multi-shaft gas turbine engines. Smaller bearing diameters provided by the present invention permit a weight savings and reduce bearing DN which further extends the life of the bearings.

Stackup and concentricity related problems are also reduced and wear of the thread and locknut axial attachment apparatus is reduced.

BRIEF DESCRIPTION OF THE DRAWING

The foregoing aspects and other features of the invention are explained in the following description, taken in connection with the accompanying drawing where.

DETAILED DESCRIPTION OF THE INVENTION

Figure 1:
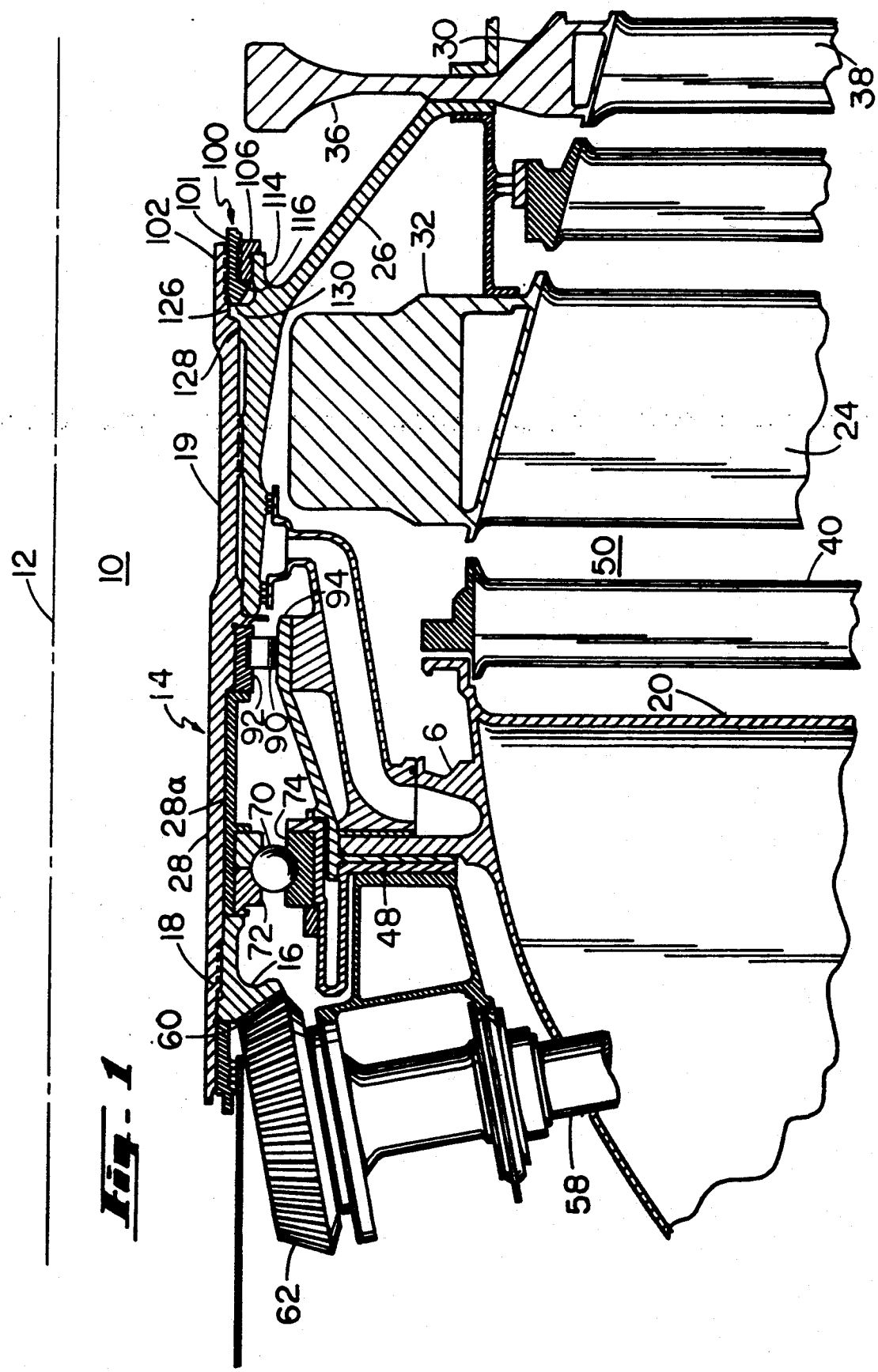
FIG. 1 is a partial view, partly in perspective and partly in cross section illustrating a power takeoff gear and engine rotor assembly of a dual shaft gas turbine engine in accordance with the preferred embodiment of the present invention.

This invention is particular but not limited to a dual rotor fan-jet gas turbine engine exemplified by the CFM series of engines by General Electric, the assignee of this patent application. Illustrated in FIG. 1, within a compressor section of a gas turbine engine 10 and circumferentially disposed about engine center-line 12, is a forward portion of a high pressure compressor (HPC) rotor assembly 14 including a gear shaft 28 having a rotor mounted power take off gear referred to as a horizontal bevel gear 16 splined to the outside of the gear shaft forward portion 18 and an HPC stub shaft 26 splined to the outside of the gear shaft aft portion 19.

Gear shaft 28 includes a radial oil scoop and bearing spacer sub-shaft 28a for directing oil to under the inner races of both bearings and spacing them apart.

HPC rotor assembly 14 includes an HPC rotor 30 bolted to HPC stub shaft 26, that operates as a forward extension of HPC rotor 30, having an axially disposed series of rotor disks exemplified by an HPC first stage disk 32 and an HPC second stage disk 36. First and second stage HPC blades 24 and 38 extend radially outward from first stage disk 32 and second stage disk 36 respectively across an core engine flowpath 50. An engine frame assembly 6 including a fan frame represented by fan strut 20 helps support rotor assembly 14. Fan strut 20 is radially disposed across core engine flowpath 50 between a low compressor section (not shown) and an HPC section that begins at HPC inlet guide vanes 40.

A bearing support 48 mounted to engine frame assembly 6 supports an HPC thrust bearing 70 and an HPC radial roller bearing 90. Thrust and radial roller bearings 70 and 90 include respective inner races 72 and 92 and outer races 74 and 94. Inner races 72 and 92 are directly mounted to gear shaft 28.

A power takeoff gear box 60, also referred to as an inlet gear box, includes horizontal bevel gear 16 meshed to a mating power takeoff bevel gear 62 attached to one end of a power takeoff shaft 58 located in inlet gearbox 60. Power take off shaft 58 transfers rotational energy from HPC rotor assembly 14 across core engine flowpath 50 through fan strut 20 to power mechanically driven accessory equipment (not shown) mounted external to core engine flowpath 50.

Gear shaft 28 is secured to HPC rotor 30 by way of HPC stub shaft 26 with a conventional locknut assembly 100. Locknut assembly 100 includes an inner locknut 101 that is threaded on to the aft end 102 of gear shaft 28 and is slidably disposed within the bore of an outer locknut 106 threaded within an annular flange 114 on HPC stub shaft 26. Inner locknut 101 includes an annular clamping flange 126 that traps and clamps an annular ridge 130 on HPC stub shaft 26 between a shoulder 128 on gear shaft 28 and itself. Outer locknut 106 and inner locknut 101 bear against each other along an annular bearing face 116 so that during disassembly inner locknut 101 may be turned and axially held in place thereby forcing gear shaft 28 to move axially forward and disengage from stub shaft 26. Outer locknut 106 also retains inner locknut 101 in place after this disassembly.

While the preferred embodiment of our invention has been described fully in order to explain its principles, it is understood that various modifications or alterations may be made to the preferred embodiment without departing from the scope of the invention as set forth in the appended claims.

We claim:
1. A gas turbine engine rotor apparatus comprising:
   in generally axial serial relationship about an engine center-line,
   a rotor mounted power takeoff gear mounted to the outside of a forward portion of a gear shaft,
   an HPD rotor mounted to an aft portion of an HPC stub shaft,
   an aft portion of said HPC stub shaft mounted to the outside of an aft portion of said gear shaft, and
   at least one bearing having an inner race mounted to said outside of said gear shaft to help rotatably support said shaft and said rotor.

2. A gas turbine engine rotor apparatus as claimed in claim 1 wherein said bearing inner race is mounted to said outside of said gear shaft and axially disposed between said rotor mounted power takeoff gear and said HPC rotor.

3. A gas turbine engine rotor apparatus as claimed in claim 2 wherein said HPC rotor further comprises an axially forward extending HPC stub shaft mounted to the outside of said aft portion of said gear shaft.

4. A gas turbine engine rotor apparatus as claimed in claim 3 further comprising a second bearing having a second inner race mounted to said outside of said gear shaft between said rotor mounted power takeoff gear and said HPC rotor wherein one of said bearings is a thrust bearing and another of said bearings is a radial roller bearing.

5. A gas turbine engine rotor apparatus as claimed in claim 4 further comprising a fan frame mounted bearing support structure supporting said bearings.

* * * * *